No. 844,431. PATENTED FEB. 19, 1907.
D. H. WEHAGEN.
DELIVERY CABINET.
APPLICATION FILED AUG. 9, 1906.

2 SHEETS—SHEET 1.

Witnesses
F. C. Bally
Geo. E. Jew.

Inventor
Didrich H. Wehagen
by Milo B. Stevens & Co
Attorneys

No. 844,431. PATENTED FEB. 19, 1907.
D. H. WEHAGEN.
DELIVERY CABINET.
APPLICATION FILED AUG. 9, 1906.
2 SHEETS—SHEET 2.
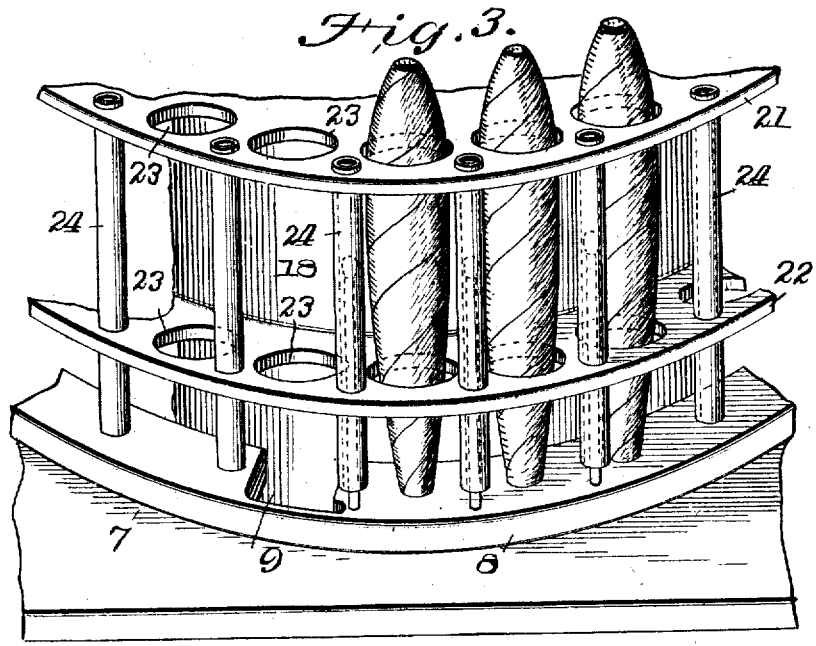
Fig. 3.
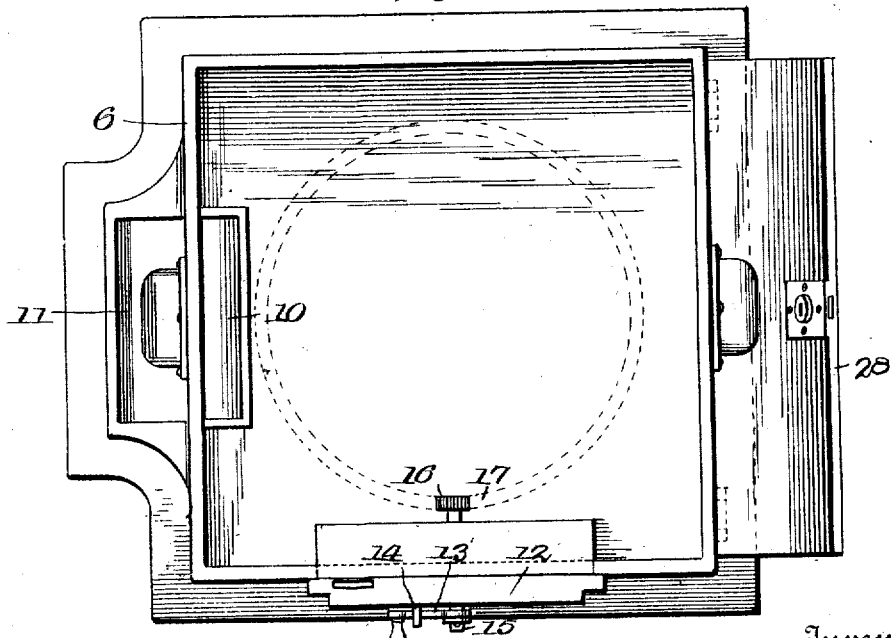
Fig. 4.
Fig. 5.
Witnesses
F. C. Barry
Geo. E. Tew
Inventor
Didrich H. Wehagen
by Milo B. Stevens & Co.
Attorneys

UNITED STATES PATENT OFFICE.

DIDRICH H. WEHAGEN, OF LORAIN, OHIO.

DELIVERY-CABINET.

No. 844,431.   Specification of Letters Patent.   Patented Feb. 19, 1907.

Application filed August 9, 1906. Serial No. 329,862.

*To all whom it may concern:*

Be it known that I, DIDRICH H. WEHAGEN, citizen of the United States, residing at Lorain, in the county of Lorain and State of Ohio, have invented new and useful Improvements in Delivery-Cabinet, of which the following is a specification.

This invention is a delivery-cabinet particularly adapted for use as a part of a machine for vending cigars and adapted in its complete embodiment to be associated with a coin-operated apparatus which will govern its operation.

The machine is arranged to vend cigars one by one, and with each cigar to deliver a match. Speaking generally, it embodies a casing having a delivery-opening and a rotary carrier mounted within the casing and having means to carry the cigars and matches so that they successively register with the delivery-opening and drop by gravity therethrough. The carrying devices are arranged around the periphery of a rotary drum, and the delivery-opening is located thereunder, so that the articles will drop through the opening as they are successively brought thereover.

The invention is illustrated in the accompanying drawings, in which—

Figure 1:
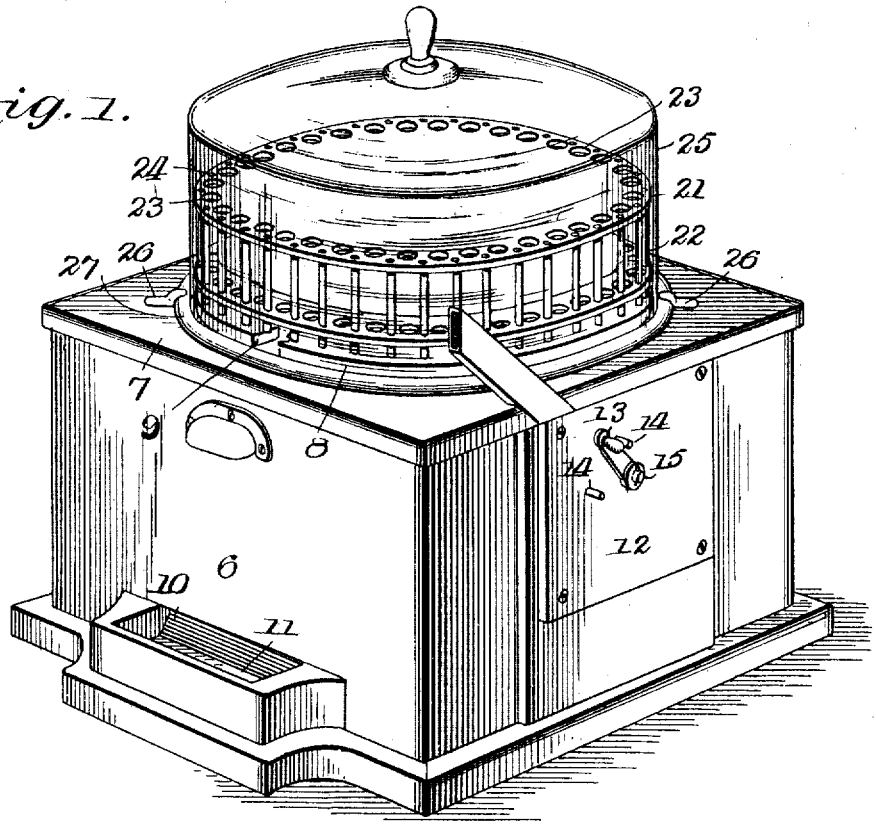
Figure 2:
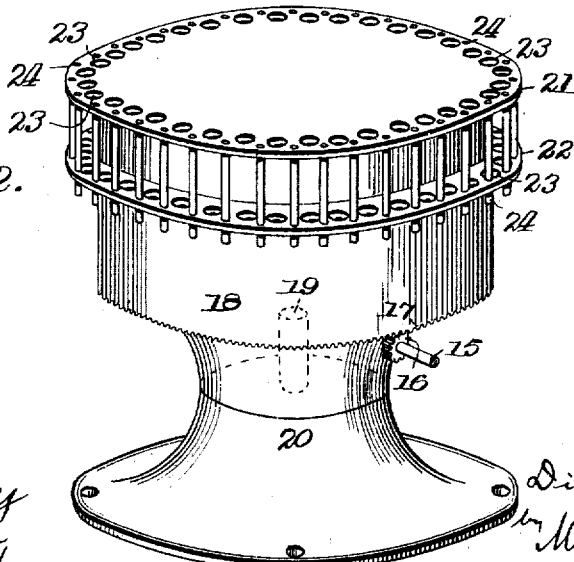

Figure 1 is a perspective view of the device. Fig. 2 is a perspective view of the rotary drum and its support removed from the casing. Fig. 3 is an enlarged detail in perspective of the carriers and delivery-opening. Fig. 4 is a detail of the casing with the cover removed. Fig. 5 is a detail in section.

Referring specifically to the drawings, 6 indicates a casing conveniently made of wood and provided with a top 7, having a central circular recess around which is a raised rim 8, which constitutes a track on which the goods to be vended are supported. This track has therein a delivery-opening 9, which extends through the top of the casing and communicates by a suitable chute 10 with a delivery-cup 11, from which the goods may be taken by the vendee. The casing 6 also serves to support a coin-controlled mechanism, (indicated as a whole at 12,) which needs no further description than to say it includes a crank 13, which has a motion limited by stops 14 and which by suitable coin-operated devices is operatively connected to a shaft 15, which carries a pinion 16, meshing with a rack 17 on the under side of the rim of the drum 18, and by means of the crank and the coin-operated devices the drum is turned step by step to deliver the goods.

The drum 18 is mounted to rotate on a spindle 19 upon a base 20 within the casing, and said drum projects through the circular recess in the top 7 of the casing, and above said top the drum is provided with upper and lower peripheral flanges 21 and 22, which project out over the delivery-outlet 9. Said flanges have therein a series of holes 23 and also a series of small tubes 24, arranged vertically with their lower ends a short space above the rim 8. The openings and the tubes are conveniently arranged in alternation, although they may be located beside each other, if desired. For the use stated—that is, to vend cigars—the holes 23 are of proper size to loosely hold a cigar therein, and the tubes 24 are of proper size to hold a match loosely. The parts are so proportioned that when the drum is turned in the manner referred to one of the tubes 24 and holes 23 will be brought to position directly above the opening 9, and the match and cigar contained therein will drop from said opening and thence to the delivery-cup. The cigars and matches rest upon the rim 8 and are carried along the same until the opening is reached. This gives a certainty and simplicity of operation which are distinguishing features of the machine.

The carrier is inclosed by a glass cover 25, which is secured to the top of the casing by means of clips 26 engaging over the rim 27 of the cover, the clips being fastened on the under side, so that they cannot be successfully tampered with. A door 28 allows access to the casing. The fastening for each of the clips may consist of a thumb-screw 29, inserted upwardly through a hole in the top of the casing into the clip. This allows the clip to be quickly loosened when it is desired to remove the glass cover for the purpose of refilling the machine. The glass cover allows it to be seen when the machine is empty and also exposes the delivery-opening, so that any apprehension or uncertainty with respect to the operation of the machine without injury to the cigar is quieted.

I claim—

1. In a delivery-cabinet, in combination, a casing having a delivery-opening therein, and a rotatable carrier on the casing comprising a circular drum having upper and lower projecting flanges at the periphery thereof provided with a series of holes and also with a corresponding series of adjacent tubes, adapted to be successively registered with the delivery-opening and to simultaneously deliver articles from the holes and the tubes by the rotation of the carrier.

2. In a delivery-cabinet, in combination, a casing having a circular recess in the top thereof and a delivery-opening beside the recess, a drum rotatably mounted in the casing and extending up through the recess, and having an overhanging rim in the casing, a rack around the same, an operating-shaft having a pinion in mesh with the rack, and means on the drum to carry goods successively to said opening, as the drum is rotated.

In testimony whereof I have signed my name to this specification in the presence of two subscribing witnesses.

DIDRICH H. WEHAGEN.

Witnesses:
SHIRLEY J. BOMMHARDT,
EDITH D. COMER.